(12) United States Patent
MacDonald

(10) Patent No.: US 11,319,128 B2
(45) Date of Patent: May 3, 2022

(54) REUSABLE FOOD STORAGE BAG AND METHOD OF MAKING SAME

(71) Applicant: ENVIROLUV INC., Hunstville (CA)

(72) Inventor: Kristi MacDonald, Huntsville (CA)

(73) Assignee: ENVIROLUV INC., Huntsville (CA)

( * ) Notice: Subject to any disclaimer, the term of this patent is extended or adjusted under 35 U.S.C. 154(b) by 58 days.

(21) Appl. No.: 16/362,248

(22) Filed: Mar. 22, 2019

(65) Prior Publication Data

US 2020/0299044 A1 Sep. 24, 2020

(51) Int. Cl.
*B65D 65/42* (2006.01)
*B65D 65/46* (2006.01)
*B65D 30/00* (2006.01)

(52) U.S. Cl.
CPC ........... *B65D 65/466* (2013.01); *B65D 29/00* (2013.01); *B65D 65/42* (2013.01)

(58) Field of Classification Search
CPC ................................ B65D 65/42; B65D 29/00
USPC ... 383/121–124, 105, 107, 108, 116, 117, 1; 139/389
See application file for complete search history.

(56) References Cited

U.S. PATENT DOCUMENTS

| | | | | |
|---|---|---|---|---|
| 1,795,838 A | * | 3/1931 | Cramer | D03D 25/00 139/420 B |
| 2,127,012 A | * | 8/1938 | Spangler | B65D 29/02 383/112 |
| 2,321,367 A | * | 6/1943 | Diggin | C25D 17/10 204/279 |
| 4,127,155 A | * | 11/1978 | Hydorn | A45C 3/04 383/106 |
| 2018/0071768 A1 | * | 3/2018 | Desrosiers | B05C 11/025 |

\* cited by examiner

*Primary Examiner* — Jes F Pascua
*Assistant Examiner* — Nina K Attel
(74) *Attorney, Agent, or Firm* — Barnes & Thornburg LLP

(57) ABSTRACT

A reusable food storage bag manufactured from material which is sewn to form a bag with an opening and has been soaked in a solution containing bees wax, oil, and resin. Also, a method of making a reusable food storage bag comprising the steps of obtaining a piece of rectangular material, folding the material in half lengthwise, double folding side edges of the material in a tapered fashion, and soaking the material in a solution comprising bees wax, oil, and resin.

18 Claims, 7 Drawing Sheets

REUSABLE FOOD STORAGE BAG AND METHOD OF MAKING SAME

FIELD OF THE INVENTION

This invention relates to a reusable food storage bag and method of making same. More particularly, this invention relates to a reusable food storage bag that is manufactured from material which is stitched to form a bag with an opening and has been soaked in a solution containing bees wax, oil, and resin.

BACKGROUND OF THE INVENTION

Furthermore, the hanger assemblies frequently are subsequently zinc plated to provide corrosion resistance which leads to complicated and extended supply chains. With many different products, the set-up times in preparation to weld the hangers is often more significant than the weld run time since each setup is typically unique.

Single use plastics, such as bags made from thin polyethylene are commonly used for storing food such as sandwiches, fruits, vegetables, snacks and the like. These plastic bags are generally used once and then discarded thereby creating excess waste. While the plastic bags may be recycled, many end up in landfill sites or worse make their way into rivers, lakes and oceans. Even if these bags are recycled, the recycling process causes further pollution.

SUMMARY OF THE INVENTION

The applicant has invented a reusable food storage bag that is manufactured from non-plastic material which is folded and stitched to form a bag with an opening. The material is preferably cotton, organic cotton, hemp, or the like, and is soaked in a solution containing bees wax, oil, and resin so that the material is resistant to liquid permeability but does not present a health hazard when foods are stored in the bag and in contact with the material. In addition, the side seams of the material are double folded, and then sewn or stitched to provide enhanced liquid impermeability while being easy to manufacture. In particular, the current invention is directed to a reusable food storage bag that:
1. Can be reused many times and is bio-degradable;
2. Is substantially impermeable to liquids;
3. Is safe for contact with edible foods;
4. Preserves food longer; and
5. Lessens environmental pollution and waste.

In one embodiment, the current invention resides in a reusable food storage bag formed from a material, the bag comprising: an open top, a closed bottom, a first side edge, and a second side edge, wherein the first side edge has a first side edge double fold with stitching therealong, and the second side edge has a second side edge double fold with stitching therealong; and the material has been soaked in a solution comprising bees wax, oil, and resin.

Preferably, the solution comprises bees wax, Jojoba oil, and tree resin.

Preferably, the stitching on the first and second side edge double folds is on the top 75 to 90 percent of a length of the double folds.

More preferably, the bag is tapered with a larger width at the open top than a width of the closed bottom.

Still more preferably, the material is selected from the group consisting of: cotton, organic cotton, and hemp.

In another embodiment, the current invention resides in a method of forming a reusable food storage bag, comprising the steps of:
A. Obtaining a piece of material with a generally rectangular shape having a top edge, a bottom edge, a first side edge, and a second side edge;
B. Folding the piece of material substantially in half so that the top edge and bottom edge are generally aligned, and the first side edge and second side edge are generally aligned;
C. Folding the first side edge twice towards a middle of the material to form a first side edge double fold, and folding the second side edge twice towards the middle of the material to form a second side edge double fold;
D. Stitching the first side edge double fold and the second side edge double fold; and
E. Soaking the material in a solution comprising bees wax, Jojoba oil, and tree resin.

Preferably, the method further comprises the step of heating the solution to a temperature between about 64 degrees Celsius and about 70 degrees Celsius, and more preferably to a temperature of 66 degrees Celsius.

More preferably, the method further comprises the step of drying the material after it has been soaked in the solution to full saturation.

Further and other features of the invention will be apparent to those skilled in the art from the following detailed description of the embodiments thereof.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

Figure 1:
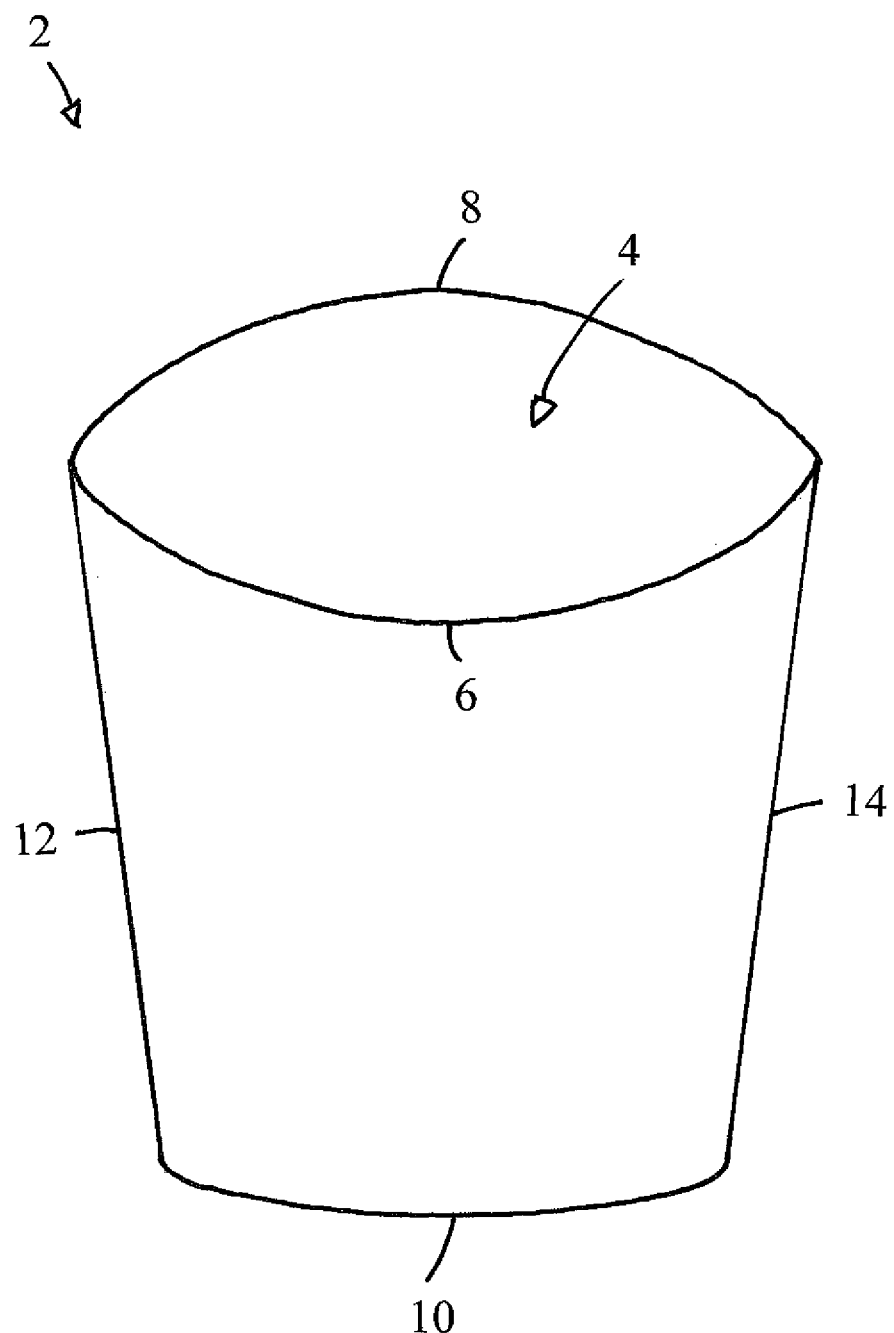
FIG. 1 shows a reusable food storage bag in accordance with one embodiment of the current invention.

FIG. 1 shows a reusable food storage bag 2 in accordance with one embodiment of the current invention. The bag 2 has an opening 4 at a top end of the bag 2. The opening has a front lip 6 and a rear lip 8. The bag 2 has a closed bottom 6. As shown in FIG. 1, the bag 2 has a first side 12 and a second side 14. The first side 12 and the second side 14 have been formed by folding the material used to make the bag 2, and stitching the folded edges of material together, as is described in more detail below.

Figure 2:
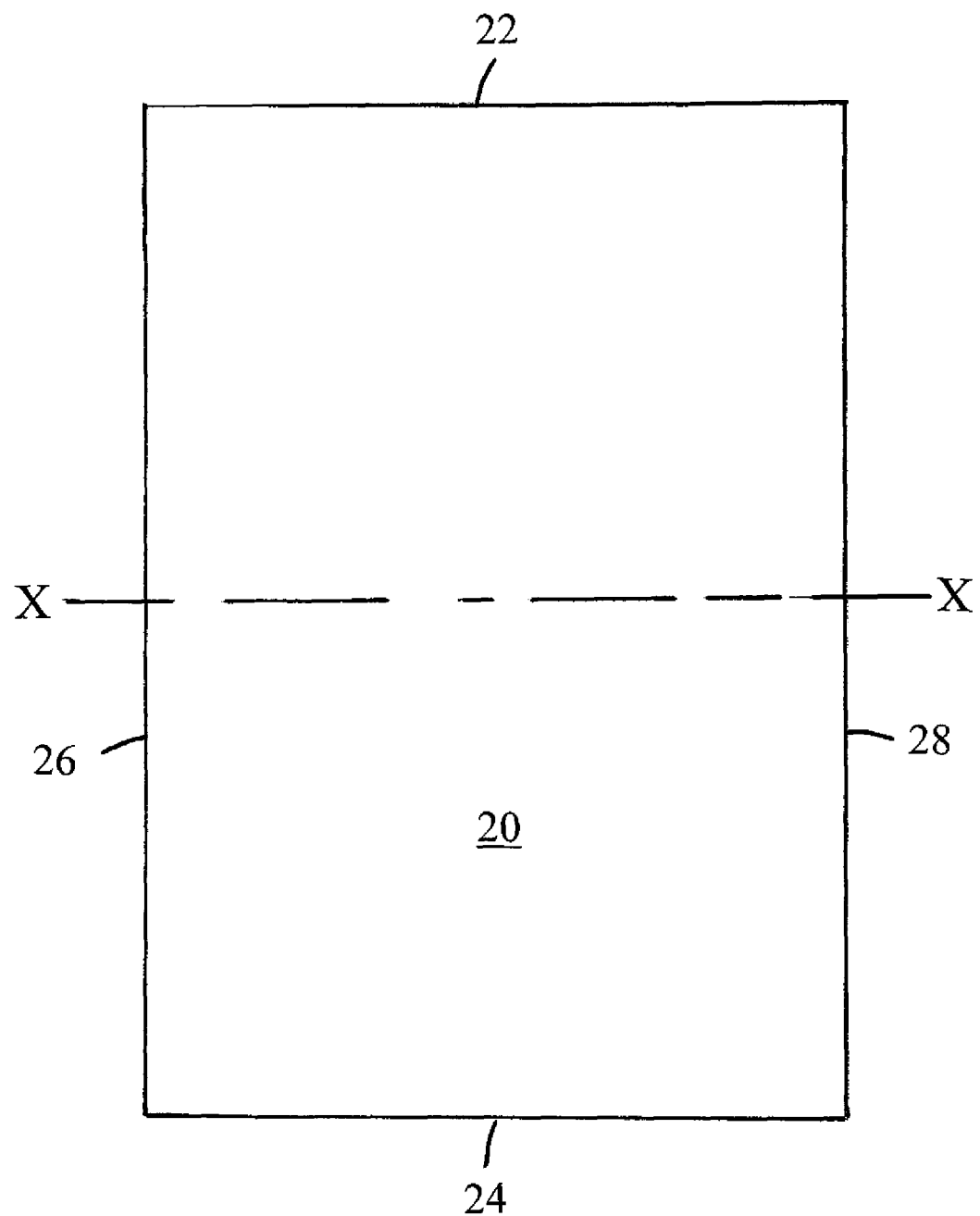
FIG. 2 shows a piece of material used in manufacturing the food storage bag of FIG. 1.

FIG. 2 shows a generally rectangular piece of material 20, which is used to make the reusable food storage bag 2 such as the one shown in FIG. 1. The material 20 can be cut from a larger piece of material or produced, for example by mass production in a factory. In a preferred embodiment, the material is a fabric material such as cotton, organic cotton, hemp, and the like.

The material 20 has a first end 22 and a second end 24, and a first side 26 and a second side 28. The first step in manufacturing the reusable food storage bag such as the one shown in FIG. 1 is to fold the material 20 substantially in half along axis X-X, as shown in FIG. 3.

Figure 3:
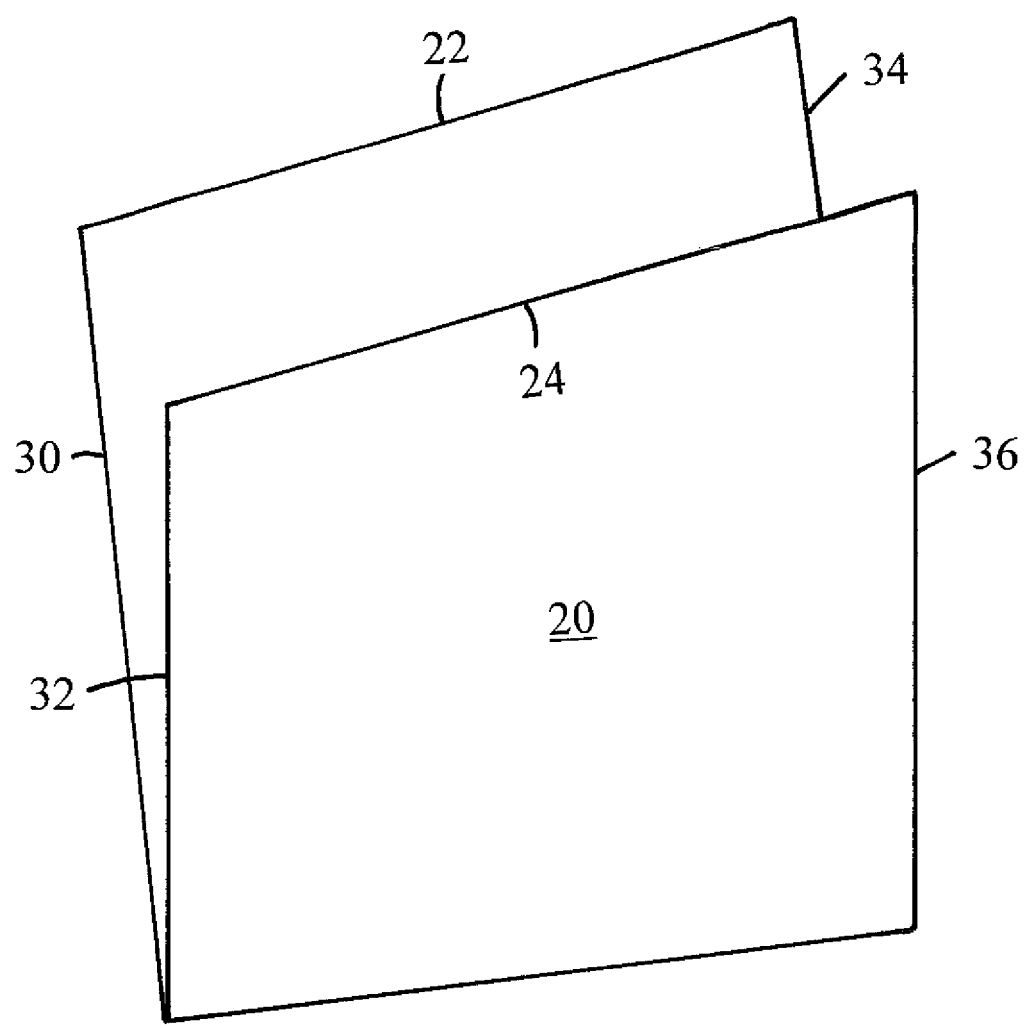
FIG. 3 shows the piece of material of FIG. 2 which has been folded.

As shown in FIG. 3, the material 20 has been folded along axis X-X. The first side 26 is essentially divided into a first portion 30 and a second portion 32. The second side 28 is divided into a first portion 34 and a second portion 36. The first portion 30 and the second portion 32 of the first side 26 will contact each other to form a first side seam. The first portion 34 and the second portion 36 of the second side 28 will contact each other to form the second side seam.

Figure 4:
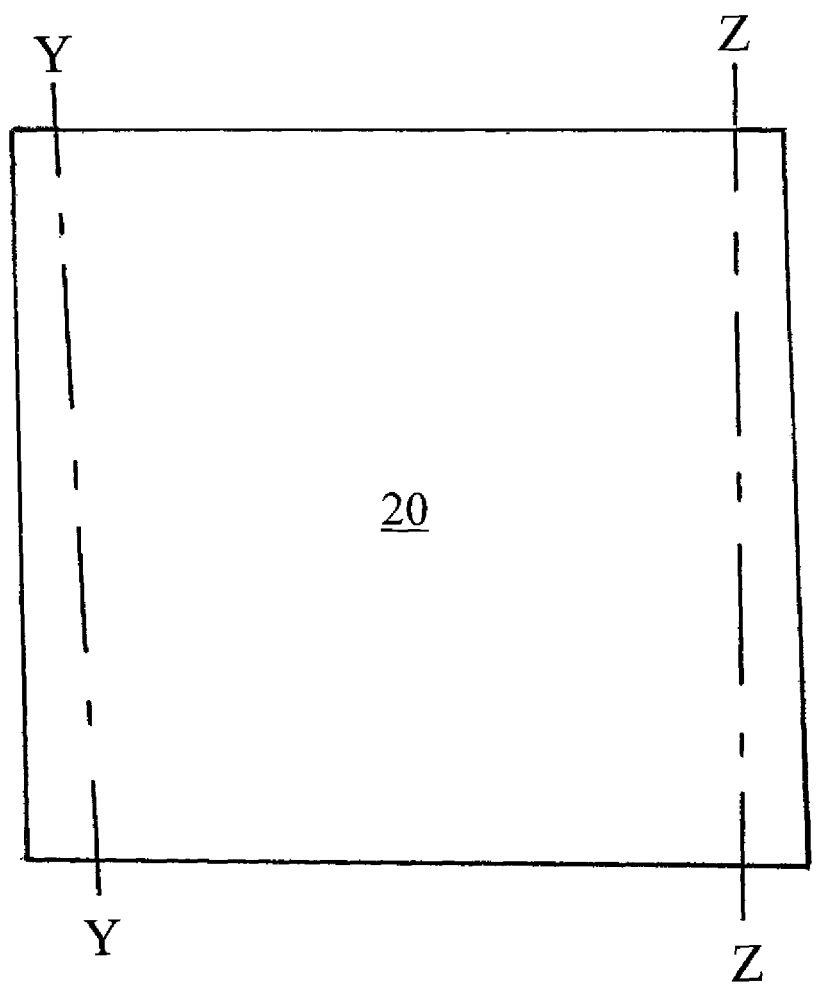
FIG. 4 shows the folded piece of material of FIG. 3 with axis for the side edge fold lines.

FIG. 4 shows the material 20 after it has been folded along axis X-X. As shown, the edges of the first portion 30 and the second portion 32 of the first side 26 are aligned to form the first side seam, and the edges of the first portion 34 and the second portion 36 of the second side 28 are aligned to form the second side seam. The next step is to fold the first portion 30 and the second portion 32 of the first side 26 along axis Y-Y, and to fold the first portion 34 and the second portion 36 of the second side 28 along axis Z-Z. The axis Y-Y and Z-Z are preferably aligned so that the edges of the material 20 are folded such that the material has a tapered profile, as shown.

Figure 5:
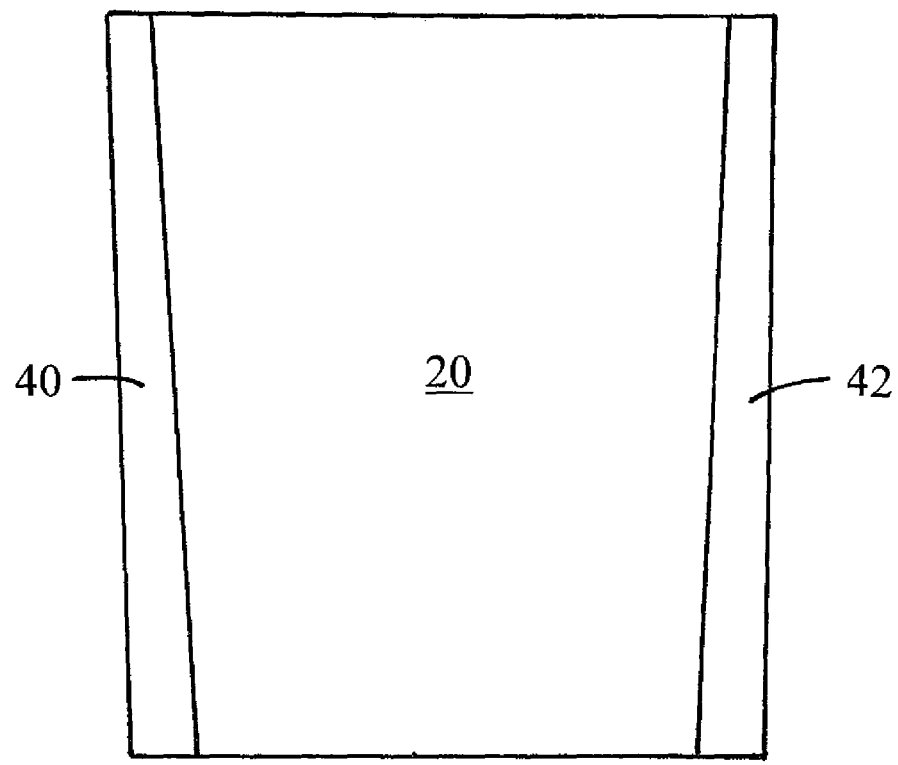
FIG. 5 shows the folded piece of material of FIG. 4 with the side edges folded once.

FIG. 5 shows the material 20 after folding along axis Y-Y and Z-Z as shown in FIG. 4 to form a first side first fold 40 and a second side first fold 42.

Figure 6:
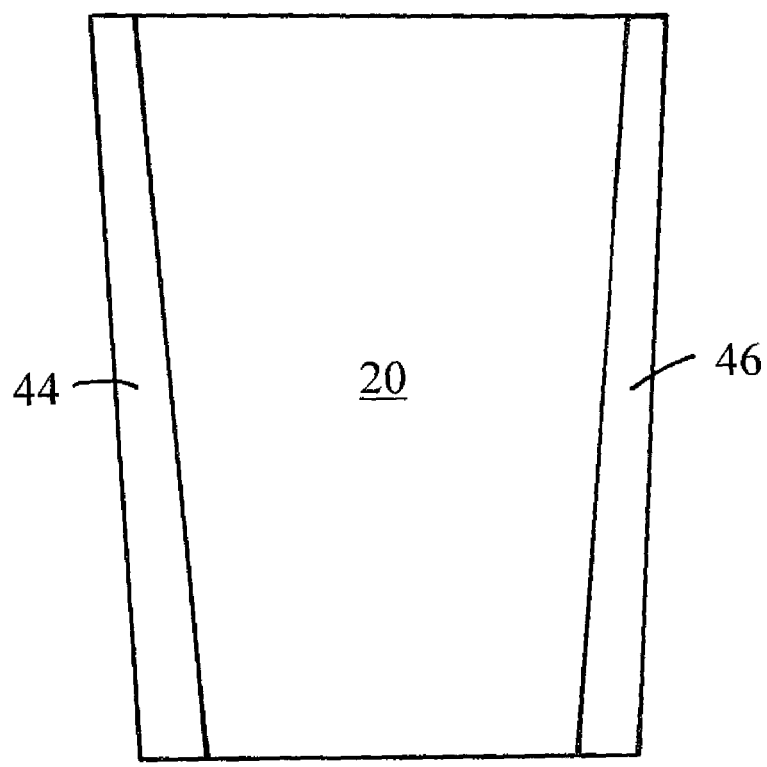
FIG. 6 shows the folded piece of material of FIG. 5 with the side edges folded twice.

FIG. 6 shows the material 20 after additionally folding the first side first fold over again to form a first side second fold 44, and folding the second side first fold over again to form a second side second fold 46.

Figure 7:
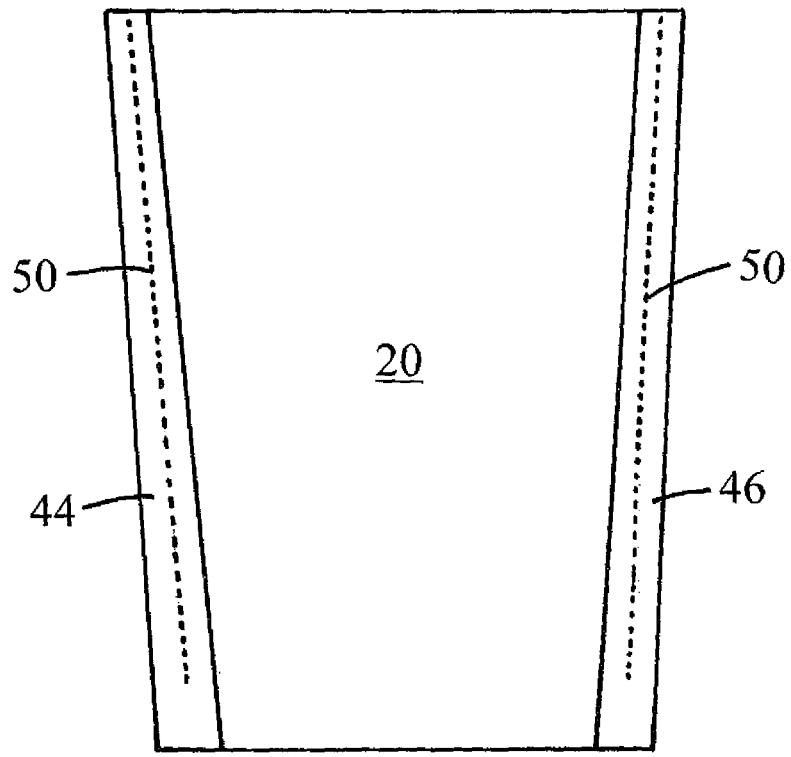
FIG. 7 shows the folded piece of material of FIG. 6 with the double folded side edges stitched.

As shown in FIG. 7, the material 20 is sewn along a line substantially along a line through a middle of the first side second fold 44 and the second side second fold 46. As shown, preferably the stitching is stopped before reaching a bottom edge; however the stitching could continue to the bottom edge. Preferably, the stitching is only on the top 75% to 90% of the length of the double folds since stitching may decrease the liquid permeability of the bag. The stitching can be any suitable material such as cotton thread.

After the stitching is completed, the material 20 is soaked in a solution consisting of bees wax, Jojoba oil, and tree resin, which solution has been heated, until the material 20 is saturated. Preferably, the solution is heated to just above the melting point of bees wax. Preferably, the temperature of the solution is heated to between 64 to 70 degrees Celsius, and more preferably the temperature of the solution is heated to 66 degrees Celsius. After becoming saturated, the material is removed from the solution and permitted to dry. Preferably, the top of the bag is then cut to provide clean top edges.

It is appreciated that the method for making the reusable food storage bags could be done on a small scale with bags being made one at a time, or mass produced in a factory with fully automated folding and stitching equipment, a large container with solution, and hanging racks with blowing dryers.

In a preferred embodiment, fabric is cut to appropriate dimensions for a small, medium & large bag. Preferably, a small size bag has a height of 7 inches, a bottom width of 6 inches, a top width of 7 inches. Dimensions for a preferred medium size bag include a height of 9 inches, a bottom width of 6 inches, and a top width of 7 inches. A preferred large size bag has a height of 14 inches, and bottom width of 11 inches and a top width of 12 inches. It is also noted that different sizes of bags can be produced to fit with their intended use.

Preferably, the material is folded twice in the following measurements: the bottom is folded ¾ inches from the edge, and the top is folded ½ inch from the edge. Folding in this manner gives the bag a larger opening at the top than the bottom of the bag, with a total variance of 1 inch.

Accordingly, dimensions for the cut material for a small size bag would be 14 inches in length and 9 inches in width. Accordingly, dimensions for the cut material to make a medium size bag would be 18 inches in length and 10 inches in width. Accordingly, dimensions for the cut material to make a large size bag would be 28 inches in length and 16 inches in width.

Preferably, once folded, the seam that is created from folding is stitched in the centre from the top to bottom stopping ¾ inches from the bottom. The inventor has appreciated that, by double folding the side edges of the material and then stitching the side edges, and soaking the material in a solution comprising bees wax, Jojoba oil, and tree resin, the reusable food storage bag has a substantially liquid resistant seal.

Although this disclosure has described and illustrated certain preferred embodiments of the invention, it is also to be understood that the invention is not restricted to these particular embodiments rather, the invention includes all embodiments which are functional, or mechanical equivalents of the specific embodiments and features that have been described and illustrated herein.

It will be understood that, although various features of the invention have been described with respect to one or another of the embodiments of the invention, the various features and embodiments of the invention may be combined or used in conjunction with other features and embodiments of the invention as described and illustrated herein.

The invention claimed is:

1. A reusable food storage bag formed from a material, the bag comprising:
    an open top, a closed bottom, a first side edge, and a second side edge, the first side edge having a first side edge double fold with a first stitching therealong and the second side edge having a second side edge double fold with a second stitching therealong;
    wherein the material is soaked in a solution comprising bees wax, oil, and resin and wherein the first stitching and the second stitching are tapered in their distance to the respective first side edge and second side edge.

2. The reusable food storage bag of claim 1, wherein the solution comprises bees wax, Jojoba oil, and tree resin.

3. The reusable food storage bag of claim 2, wherein the stitching on the first and second side edge double folds is on the top 75 percent of a length of the double folds.

4. The reusable food storage bag of claim 2, wherein the stitching on the first and second side edge double folds is on the top 90 percent of a length of the double folds.

5. The reusable food storage bag of claim 4, wherein the bag is tapered with a larger width at the open top than a width of the closed bottom.

6. The reusable food storage bag of claim 5, wherein the material is selected from the group consisting of: cotton, organic cotton, and hemp.

7. The reusable food storage bag of claim 2, wherein the bag is tapered with a larger width at the open top than a width of the closed bottom.

8. The reusable food storage bag of claim 1, wherein the stitching on the first and second side edge double folds is on the top 75 percent of a length of the double folds.

9. The reusable food storage bag of claim 8 wherein the bag is tapered with a larger width at the open top than a width of the closed bottom.

10. The reusable food storage bag of claim 1, wherein the bag is tapered with a larger width at the open top than a width of the closed bottom.

11. The reusable food storage bag of claim 1, wherein the material is selected from the group consisting of: cotton, organic cotton, and hemp.

12. The reusable food storage bag of claim 1, wherein the material is soaked subsequent to insertion of the first stitching and the second stitching.

13. A method of forming a reusable food storage bag, comprising the steps of:
   obtaining a piece of material with a generally rectangular shape having a top edge, a bottom edge, a first side edge, and a second side edge;
   folding the piece of material substantially in half so that the top edge and bottom edge are generally aligned, and the first side edge and second side edge are generally aligned;
   folding the first side edge twice towards a middle of the material to form a first side edge double fold, and folding the second side edge twice towards the middle of the material to form a second side edge double fold;
   stitching the first side edge double fold with a first stitching and the second side edge double fold with a second stitching, wherein the first stitching and the second stitching are tapered in their distance to the respective first side edge and second side edge; and
   soaking the material in a solution comprising bees wax, Jojoba oil, and tree resin.

14. The method of claim 13, further comprising the step of heating the solution to a temperature between about 64 degrees Celsius and about 70 degrees Celsius.

15. The method of claim 14, wherein the temperature of the solution is about 66 degrees Celsius.

16. The method of claim 14, comprising the further step of drying the material after it has been soaked in the solution to full saturation.

17. The method of claim 13, comprising the further step of drying the material after it has been soaked in the solution to full saturation.

18. The method of claim 13, wherein the material is soaked subsequent to insertion of the first stitching and the second stitching.

* * * * *